United States Patent [19]
Laurion

[11] 3,847,443
[45] Nov. 12, 1974

[54] SPOKED WHEEL AND WHEEL ORNAMENT

[76] Inventor: Francis R. Laurion, 211 Sherman St., Vassar, Mich. 48768

[22] Filed: Dec. 29, 1972

[21] Appl. No.: 319,699

[52] U.S. Cl. ................................. 301/37 R, 37/5 A
[51] Int. Cl. ............................................. B60b 7/02
[58] Field of Search ............ 301/37 SA, 37 P, 37 R

[56] References Cited
UNITED STATES PATENTS

| | | | |
|---|---|---|---|
| 607,703 | 7/1898 | Peters .............................. | 301/37 R |
| 2,621,081 | 12/1952 | Mann .............................. | 301/37 P |
| 3,565,489 | 2/1971 | Erinberg ......................... | 301/37 SA |

OTHER PUBLICATIONS
Wheel Covers – Advertising Brochure of U.S. Product Dev. Co., Zionsville, Ind., Jan. 1964.

Primary Examiner—Philip Goodman
Attorney, Agent, or Firm—John J. Swartz

[57] ABSTRACT

In combination with a wheel for a bicycle and the like having an annular rim, a hub rotatable about its axis, and axially offset groups of circumferentially spaced spokes which centrally support the hub on the rim; a wheel decorating ornament comprising an annular, planar sheet of material decorated on opposite sides, axially disposed between the groups of spokes and radially disposed between the rim and the hub.

7 Claims, 3 Drawing Figures

PATENTED NOV 12 1974　　3,847,443

SPOKED WHEEL AND WHEEL ORNAMENT

BACKGROUND OF THE INVENTION

This invention relates to wheel ornaments for spoked wheels, such as bicycle wheels, and more particularly to a wheel having axially spaced apart groups of support spokes and a bicycle ornament disposed axially between the spokes.

A bicycle having decorated wheel spokes is not only enhanced in appearance, but is more readily identifiable by a motorist and thus the safety of one riding on a decorated bicycle is improved. Such decorations can be particularly important when a bicycle is being ridden during the hours of dusk when visibility is substantially impaired. The interlacing of decorative material through the spokes in a serpentine fashion is difficult for a young child to accomplish and requires substantial amounts of material because this method of decorating mandates that both sets of axially spaced spokes be decorated to provide a balanced ornamental effect. Material which is sufficiently flexible to be interlaced with the spokes generally does not have sufficient strength to withstand the elements and treatment afforded them by small children.

Bicycles are generally provided with wheels selected from a group of standard size wheels having a diameter which mounts tires having an outer diameter of 16, 20, 24, and 26 inches and are generally referred to as 16, 20, 24, or 26 inch wheels, respectively. Although the hubs of all front bicycle wheels are generally of the same diameter and the hubs of all rear bicycle wheels are generally of the same diameter, the rear bicycle wheel, which is commonly the drive wheel, has a drive hub with a diameter that is larger than the hub diameter of the front wheel and thus less decoration material will be required to fully decorate a rear wheel than the same size front wheel. If a wheel ornament manufacturer provides separate sets of ornaments for each size wheel, with separate size ornaments for each of the front and rear wheels of each size wheel, the manufacturing and distribution costs will be exorbitant.

A bicycle wheel ornament constructed according to the present invention is readily adapted to fit any one of the various diameter, standard-size bicycle wheels, including either the front and rear wheel. The bicycle ornament comprises an annular sheet of substantially planar material which is sufficiently thin to permit installation between the axially spaced groups of bicycle spokes but is sufficiently thick so as to be self-supporting and able to withstand the elements and treatment of children. Opposite sides of the ornament are decorated with spiral-forming indicia which creates an "eye-catching" pattern when the wheel is rotated to signal motorists of a passing bicycle and thus improve bicycle safety.

Other objects and advantages of the present invention will become apparent to those of ordinary skill in the art as the following description thereof proceeds.

SUMMARY OF THE INVENTION

In combination: a wheel for a vehicle, such as a bicycle and the like, comprising an annular rim for mounting a ground-engaging tire, a central hub for mounting the wheel on a vehicle for rotation about its axis, and first and second groups of axially offset, circumferentially spaced spokes centrally supporting the hub on the rim; a wheel decorating ornament comprising a one-piece, annular sheet of generally planar material axially disposed between the axially offset groups of spokes and radially disposed between the rim and the hub. The sheet of material has an outer diameter less than the inner diameter of the rim and a central recess frictionally engaging the hub so as to rotate therewith. The sheet of material is adapted to be radially split or severed to provide confronting free ends which permit the sheet of material to be inserted into or removed from a position between the axially offset groups of spokes.

The present invention may more readily be understood by reference to the accompanying drawings in which.

Figure 3:
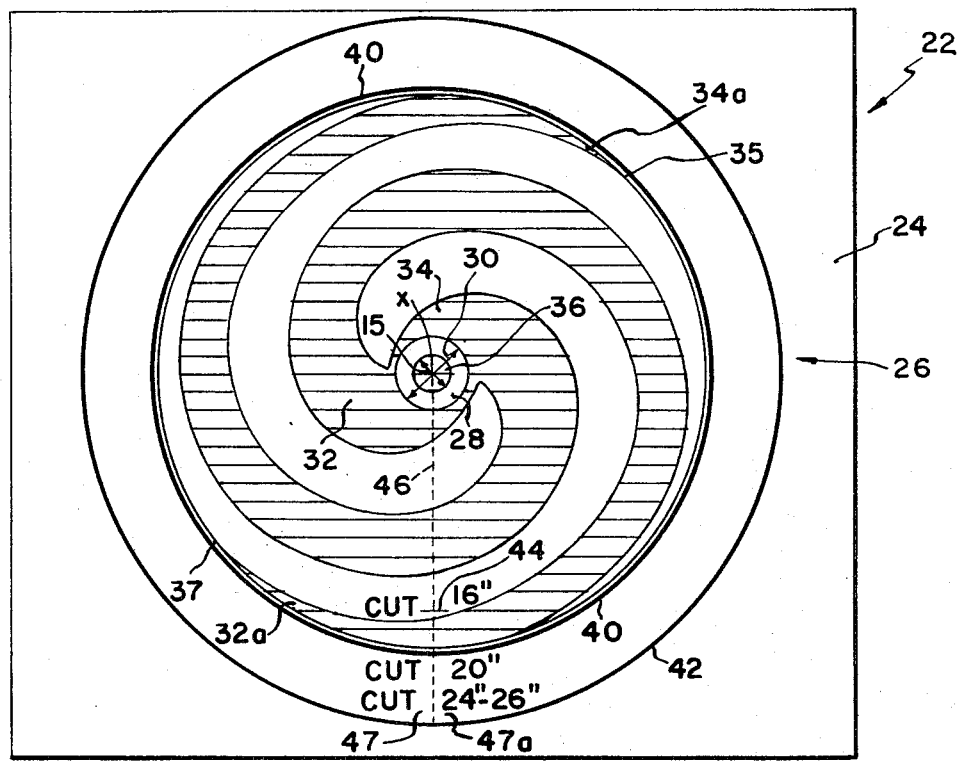
FIG. 3 is a side elevational view of the ornament prior to being trimmed and inserted between the spokes of a wheel as illustrated in FIGS. 1 and 2.
Figure 1:
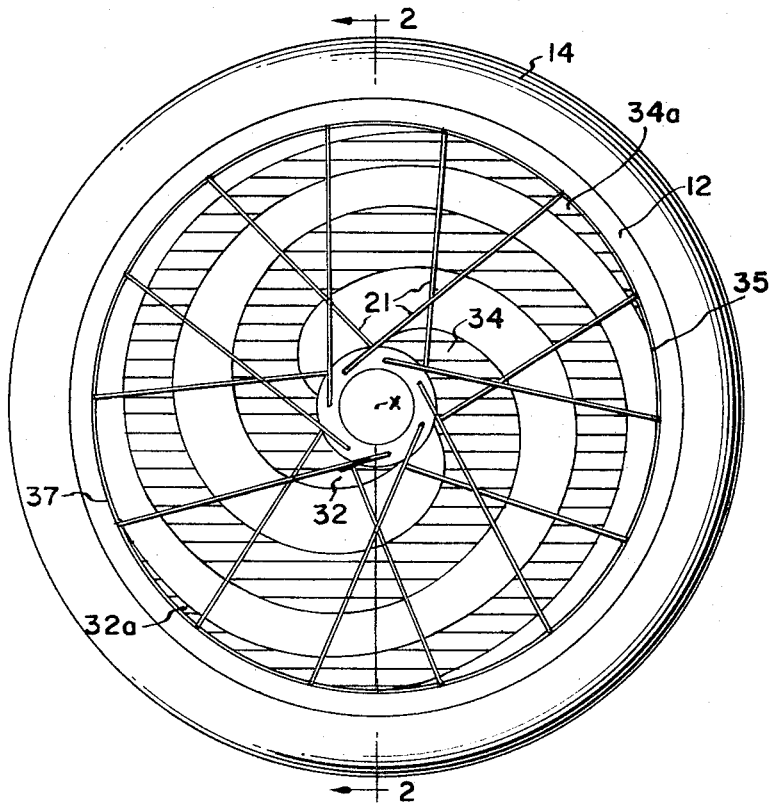
FIG. 1 is an axial end elevational view illustrating the combination of a spoked wheel and a wheel decorating ornament constructed according to the present invention.

Referring now more particularly to the drawings, a bicycle wheel, generally designated 10, includes an annular rim 12 mounting an inflated ground-engaging tire 14 as usual. The wheel 10 includes a central hub 16 which may be mounted, by an axle L, on the yoke Y of a bicycle for rotation about the axle's axis $x$. The hub 16 is supported on the rim 12 by first and second axially spaced groups 18, 20 of circumferentially spaced, individual spokes 21, as usual. The spokes 21 of each group 18 and 20 are oppositely vertically inclined so that the radially inner ends 21a of the axially offset groups 18 and 20 of spokes 21 are spaced apart a distance greater than the axial spacing between the radially outer spoke ends 21b.

A bicycle wheel ornament, generally designated 22 (FIG. 3), is provided and includes a substantially planar sheet 24 of synthetic plastic such as extruded, high impact, polystyrene having a thickness $t$ within the range of 0.010 inch to 0.030 inch. If the thickness of the material is less than 0.010 inch, the sheet may not have sufficient strength to support itself and if the thickness of the material is greater than 0.030 inch, it may not be easily threaded between the spoke groups 18 and 20 without damaging the sheet material. The spacing between the radially outer spoke ends 21b, on at least some bicycle wheels, will be less than the thickness $t$ of the ornament so that the peripheral portion of the ornament will be pinched between the spoke ends 22b.

Figure 2:
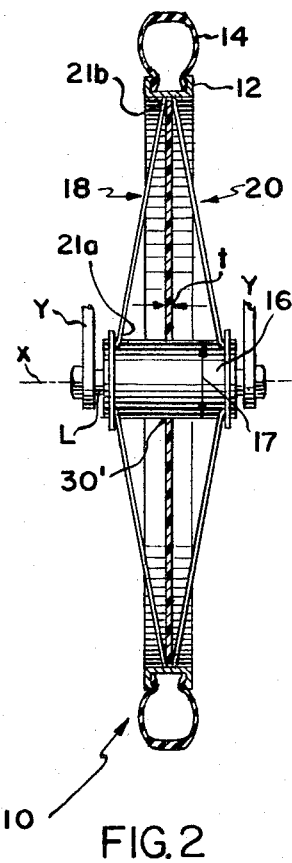
FIG. 2 is a vertical sectional view, taken along the line 2—2 of FIG. 1.

Indicia, generally designated 26 and comprising phosphorescent or luminescent paint, is printed on each side of the sheet 24 and includes a centrally located, circular portion 36 having a diameter 15 substantially equal to or only slightly greater than the outer diameter 17 (FIG. 2) of a front wheel hub 16. A non-printed, annular portion 28 surrounds the printed portion 26 and has an outside diameter 30 substantially equal to or only slightly greater than the diameter of a rear wheel hub. Since the diameter of the rear wheel hub is substantially greater than the diameter of a front wheel hub 16, the diameter 30 of the non-printed portion 28 is substantially greater than the diameter 15 of the printed portion 26. The indicia 26 also includes diametrically opposed strips 32 and 34, on each side of the sheet 22, which wind around the wheel axis $x$ and gradually radially outwardly recede from the axis x to define radially interposed, decorated and non-decorated symmetrical spiral strips each having a progressively decreasing radial width.

The radially reduced ends 32a and 34a of the spiral strips 32 and 34 terminate in arcuate strips 35 and 37, respectively, which span the strip ends 32a and 34a, are of substantially uniform radial width, and have a curvature corresponding to the curvature of the end portions 34a and 32a. The indicia 26 also includes an annular ring 40, on each side of the sheet 22, encircling the spiral forming strips 32 and 34 and spaced from the arcuate strips 35 and 37 by a non-printed annular portion. The outer diameter of the ring 40 is equal to 15½ inches.

The indicia 26 includes the instruction "cut 20″ ", which is printed on each side of the sheet adjacent the ring 40 indicating that the sheet 22 is to be cut along the outside edge of the ring 40 if the ornament is to be placed between the rim 12 and the hub 16 of a standard 20 inch bicycle wheel. The indicia 26 includes another strip 42 concentric with each strip 40 and having an outer diameter equal to 19¼ inches. The instructions "cut 24 - 26″ " is printed on both sides of the sheet 22 adjacent the ring 42 to indicate that the sheet 22 is to be cut along the outside of ring 42 if the ornament to be placed between the rim 12 and hub 16 of a wheel which will mount a 24 or 26 inch diameter tire. If the ornament is mounted on a 26 inch wheel, a small annular gap will be provided between the strip 42 and the rim 12, but this is not objectionable.

The indicia 26 includes a concentric arc 44 printed on both sides of the sheet 22 radially inwardly of the strip 40. Each arc 44 has an outer radius 5¾ inches. The indicia 26 includes the instruction "cut 16″ " adjacent each arc 44 indicating to the user that the sheet 22 is to be cut along a circle having an outer circumference lying along the arc 44 to fit between the rim 12 and hub 16 of a 16 inch wheel.

The indicia 26 includes a radial line portion 46 printed on each side of the sheet 24 from the central portion 36 to the ring 40. When the ornament is cut along the line 46, free ends 47 and 47a are provided which are threaded firstly between a pair of adjacent spokes 22 of either the group of spokes 18 and 20 and then between the axially spaced groups of spokes 18 and 20.

The trimmed wheel ornament may be inserted between the spokes 18 and 20 without the necessity of removing the wheel 10 from the yoke Y of the bicycle. To install the bicycle ornament on the front wheel of a bicycle having standard size 24 inch front and rear wheels, for example, the user cuts the sheet 22 completely around the outside of the ring 42 and then cuts along the radial line 46 between the strip 42 and the axis x to provide free ends 47 and 47a. Next, the circular mid-portion 28 is removed to provide an annular sheet having a central aperture 30′ (FIG. 2) which will snugly receive the hub 16 of the front wheel. The ornament is then placed axially adjacent the front wheel 10 with the aperture 30′ (FIG. 2) in the ornament aligned with the wheel axle axis x. One of the free ends 47 and 47a is inserted between a pair of circumferentially adjacent spokes 22 of one spoke group 18, 20 and the annular ornament is then rotated about the axis x to continually feed the ornament to a position between the spokes in the groups 18 and 20. The ornament is not interlaced between the adjacent spokes 22 of the groups 20 or 18, individually or collectively, but rather, is interposed between the groups 18 and 20 so that all of the spokes of group 18 are on one side of the ornament and all of the spokes of group 20 are on the opposite side of the ornament. After the ornament has been turned through 360°, the entire ornament will be disposed in the position illustrated in FIG. 2 with the ornament tightly supported by the hub 16. The frictional drag between either the hub 16 and inner portion of the ornament or the outer spoke ends 21b and the outer portion of the wheel ornament is sufficient to move the ornament with the wheel when the wheel is spun. The ornamental appearance will be the same on each side of the wheel 10 and when the wheel is spun, the ornament will spin therewith to create an eye-catching effect which will improve bicycle safety.

The same procedure is followed for the rear wheel except that the sheet is cut to remove the enlarged diameter portion 26 to accommodate the enlarged diameter hub of the rear wheel.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. In combination;
   a wheel for a vehicle, such as a bicycle and the like, comprising:
   an annular rim mounting a ground-engaging tire;
   a central hub for mounting the wheel on a vehicle for rotation about its axis; and
   first and second groups of axially offset, circumferentially spaced spokes mounting the hub on said rim; and
   a wheel decorating ornament comprising a one-piece, annular sheet of generally planar, flexible material interposed between said axially offset groups of spokes and radially disposed between said rim and said hub, said sheet of material having an axle accommodating opening at its center and one uninterrupted slit extending from said axle accommodating opening to the periphery of said sheet, the stiffness of said material being such that the portions of said sheet immediately adjacent said slit are normally in abutting relation with each other and are normally aligned in the same plane but are freely axially movable relative to each other out of said plane enabling the annular sheet of material to be quickly and easily removed from a position between said axially offset groups of spokes.

2. The combination of claim 1 including indicia on each side of said sheet of material providing strip means winding around said axis and gradually radially receding from said axis, the radial width of said indicia strip means gradually decreasing radially outwardly from said axis.

3. The combination of claim 2 wherein said indicia includes first and second concentric, spaced strips encircling said strip means.

4. The combination of claim 3 wherein said sheet of material comprises synthetic plastic material having an axial thickness within the range of 0.010 – 0.030 inch.

5. The combination set forth in claim 4 wherein the radially inner portion of said indicia terminates radially outwardly of said hub to define an annular non-decorated area, surrounding said hub and having a diameter substantially greater than said hub.

6. The combination set forth in claim 5 wherein said indicia includes an arcuate strip portion radially inwardly of said concentric strips.

7. The combination set forth in claim 6 wherein said indicia comprises phosphorescent paint.

* * * * *